(12) United States Patent
Huang et al.

(10) Patent No.: US 9,742,145 B1
(45) Date of Patent: Aug. 22, 2017

(54) OFF-AXIS ZIGZAG PARAMETRIC OSCILLATOR

(71) Applicant: National Tsing Hua University, Hsinchu (TW)

(72) Inventors: Yen-Chieh Huang, Hsinchu (TW); Tsong-Dong Wang, Taoyuan (TW); Yu-Chung Chiu, Hsinchu (TW); Po-Cheng Wang, New Taipei (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 15/367,154

(22) Filed: Dec. 1, 2016

(51) Int. Cl.
*G02F 1/39* (2006.01)
*H01S 3/108* (2006.01)
*H01S 3/08* (2006.01)
*H01S 3/094* (2006.01)

(52) U.S. Cl.
CPC .......... *H01S 3/08095* (2013.01); *G02F 1/395* (2013.01); *H01S 3/094* (2013.01); *H01S 3/1083* (2013.01); *G02F 2001/392* (2013.01)

(58) Field of Classification Search
CPC ....... G02F 1/39; G02F 1/395; G02F 2001/392
See application file for complete search history.

(56) References Cited

U.S. PATENT DOCUMENTS

| 4,893,888 | A | * | 1/1990 | Okazaki | G02F 1/361 |
| | | | | | 359/328 |
| 5,028,109 | A | * | 7/1991 | Lawandy | B82Y 20/00 |
| | | | | | 359/328 |
| 5,640,480 | A | | 6/1997 | Komine | |
| 6,268,956 | B1 | | 7/2001 | Injeyan et al. | |
| 6,421,166 | B1 | * | 7/2002 | Velsko | G02F 1/39 |
| | | | | | 359/326 |

(Continued)

FOREIGN PATENT DOCUMENTS

| EP | 0820129 | 1/1998 |
| EP | 0831567 | 3/1998 |

OTHER PUBLICATIONS

Wang et al., "Multiple-beam output of a surface-emitted terahertz-wave parametric oscillator by using a slab MgO: LiNbO3 crystal", Optics Letters, Feb. 15, 2014, pp. 754-757.

(Continued)

*Primary Examiner* — Daniel Petkovsek
(74) *Attorney, Agent, or Firm* — Jianq Chyun IP Office (57) ABSTRACT

A high-efficiency non-collinearly phase matched parametric oscillator is provided, wherein a laser pumps a nonlinear optical material with a plural number of flat reflection surfaces that zigzag at least one parametrically generated off-axis radiation about the pump laser beam axis via multiple reflections from the surfaces. The off-axis zigzag oscillation of the radiation establishes parametric oscillation and improves energy coupling among mixing waves in a monolithic nonlinear optical material. Preferably the pump laser has a transverse beam size covering the area of the zigzagging parametrically generated radiation. To further enhance the performance of the off-axis zigzag parametric oscillator, the other parametrically generated radiation can be seeded by an external laser source or resonated in a cavity. The present invention also includes a double-side pumped off-axis zigzag parametric oscillator installed inside a standing-wave pump-laser cavity.

13 Claims, 9 Drawing Sheets

(56) References Cited

U.S. PATENT DOCUMENTS

| | | | | |
|---|---|---|---|---|
| 7,123,634 B2* | 10/2006 | Rothenberg | .......... | H01S 3/0606 359/337 |
| 7,710,637 B2* | 5/2010 | Ikari | .......... | G02F 1/39 359/330 |
| 7,768,695 B2* | 8/2010 | Dunn | .......... | G02F 1/39 359/330 |
| 7,953,128 B2* | 5/2011 | Creeden | .......... | G02F 1/3534 372/21 |
| 8,068,523 B2 | 11/2011 | Takeshita et al. | | |
| 8,154,792 B1* | 4/2012 | Weyburne | .......... | G02F 1/3544 359/332 |
| 2010/0054296 A1* | 3/2010 | Ohtake | .......... | G02F 1/3544 372/80 |

OTHER PUBLICATIONS

Kawase et al., "Terahertz wave parametric source", J. Phys. D: Appl. Phys., Dec. 5, 2001, pp. R1-R14.

Chiu et al., "Off-axis THz parametric oscillator in LiNbO3 slab waveguide", IRMMW-THZ 2016, 41st International Conference on Infrared Millimeter and Terahertz Waves, Sep. 25-30, 2016, pp. 1-2.

Chiu et al., "Off-axis THz parametric oscillator", OPTIC 2015, Optics & Photonics Taiwan, International Conference—Annual Meeting of Taiwan Photonics Society, National Tsing Hua University, Hsinchu, Taiwan, Quantum Electronics, Dec. 4, 2015, pp. 1-2.

Chiu et al., "THz Frequency Combs generated from Off-axis THz Parametric Oscillator at Room Temperature", The 5th Advance Lasers and Photon Sources (ALPS'16), Yokohama, Japan, May 17-20, 2016, pp. 1-2.

* cited by examiner

OFF-AXIS ZIGZAG PARAMETRIC OSCILLATOR

FIELD OF THE INVENTION

The present invention relates to a parametric oscillator, and, in particular, to a non-collinearly phase matched optical parametric oscillator whose parametrically generated radiation zigzags inside a nonlinear optical gain material with respect to the pump laser axis.

BACKGROUND OF THE INVENTION

A laser device generates coherent radiation with a wavelength fixed to the atomic transition between quantum energy levels of a laser gain medium. The pump source to a laser device can be a broadband flash lamp or a narrow-band diode laser, which provides pump radiation with its photon energy matched to the absorption transition levels of the laser gain medium. Usually the laser gain medium is contained in a laser cavity with a laser axis defined by two end mirrors. In the case of a laser amplifier, a seed laser beam enters the laser gain medium and defines the laser axis. For a diode pumped laser, there could be a pump beam direction. The laser axis relative to the pump beam direction is not limited by fundamental laser physics, but mostly determined by considerations such as overlapping efficiency with the gain medium, thermal dissipation, and hardware arrangement etc. For instance, U.S. Pat. No. 6,268,956 B1 taught an end diode-pumped laser with a zigzag laser axis in a laser crystal to increase the overlap between the pump absorption and the generated laser radiations or help thermal dissipation. Modifying the zigzag angle with respect the pump beam geometry does not change the laser wavelength or modify the coherence property of the output laser.

A nonlinear laser frequency converter is technically different from the aforementioned laser source. A nonlinear optical material is useful for converting a laser frequency to a different one without relying on quantum energy levels in the material. A nonlinear process splitting one high-frequency input photon into several low-frequency output ones is called frequency down-conversion or parametric generation, whereas its inverse process is called frequency up-conversion or sum frequency generation. For the up-conversion process, if all the low-frequency input photons have the same frequency, the process is called harmonic generation. Unlike a laser having its input or pump wave absorbed in the gain medium to emit an output wave, a nonlinear laser-frequency converter has several co-propagating waves, which are not supposed to be absorbed in the nonlinear optical gain medium. For the nonlinear frequency conversion to happen, fundamental physics imposes constraints on the relative directions of the mixing laser beams. For instance, the nonlinear laser-wavelength conversion in a quadratic nonlinear optical material permits a 3-photon or 3-wave mixing process satisfying the frequency rule $$\omega_3 = \omega_1 + \omega_2, \quad (1)$$

and the wave-vector rule $$\vec{k}_3 = \vec{k}_1 + \vec{k}_2, \quad (2)$$

where $\omega_i$ is the angular frequency and $\vec{k}_i$ is the wave vector of the $i^{th}$ wave. When multiplied by the reduced Planck constant, $\hbar = h/2\pi$, Eqs. (1,2) become conservations of photon energy and momentum. Equation (2) is often called the phase matching condition, because the multiplication of a wave-vector with a position vector gives the radiation phase. In a nonlinear mixing process, the output radiation, if any, automatically satisfies the frequency rule or photon energy conservation. However, the wave-vector rule is relevant to material dispersion and the propagation directions of the mixing waves. Ideally, collinear phase matching ($k_3 - k_1 - k_2 = 0$), where all the wave vectors are aligned collinearly in the gain medium, maximizes overlap among mixing waves and gives the best laser-frequency conversion efficiency. Unfortunately, only a small number of nonlinear optical materials have adequate dispersion for collinear phase matching over a limited spectral band width. In most collinear nonlinear wave mixing cases, the nonlinear laser frequency conversion only occurs in a dephasing distance or a so-called coherence length, given by $$L_c = \frac{\pi}{\Delta k} \quad (3)$$

where $\Delta k = |k_3 - k_1 - k_2|$. To overcome such a difficulty, U.S. Pat. No. 5,640,480 taught a phase matching scheme that requires all the collinearly propagating mixing waves to zigzag through a slab nonlinear crystal with a thickness on the order of the coherence length $L_c$, so that the phase mismatch can be compensated by the reflection phase at the crystal boundaries. For a thick crystal, this scheme becomes ineffective, as the co propagating waves between reflections remain phase mismatched for a thick distance until reaching the reflection boundaries.

Figure 1:
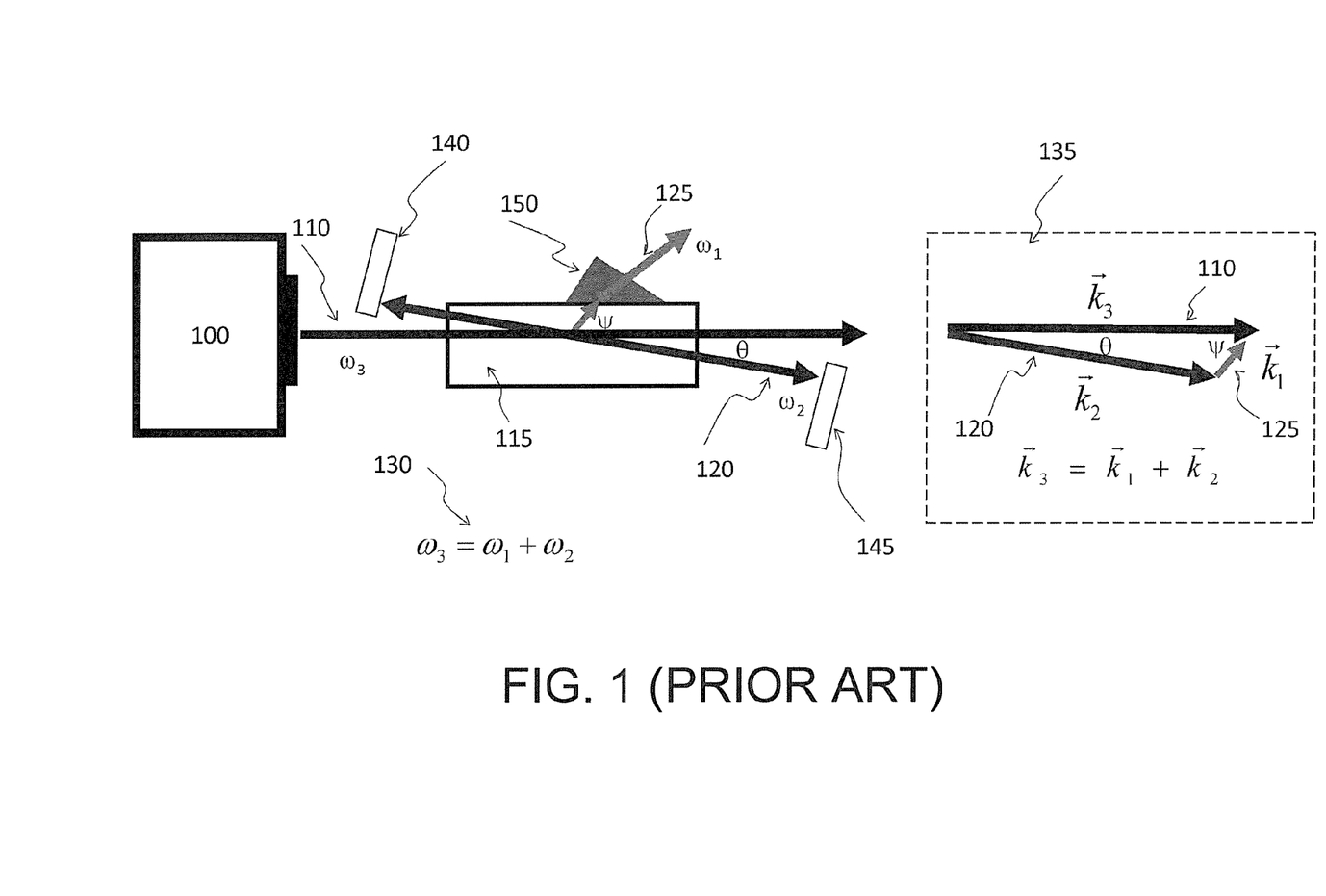
FIG. 1 is a schematic diagram showing a resonantly enhanced, non-collinearly phase matched, nonlinear laser-frequency down-converter or a parametric oscillator in the prior art.

On the other hand, nonlinear laser frequency conversion with a non-collinear phase matching configuration often suffers from poor overlap among mixing waves and thus poor conversion efficiency. FIG. 1 illustrates a resonantly enhanced, non-collinearly phase matched, nonlinear laser-frequency down-converter or a parametric oscillator in the prior art, wherein a laser source 100 generating a pump laser beam 110 with frequency $\omega_3$ is incident on a piece of quadratic nonlinear optical material 115 to generate the first frequency down converted radiation wave 125 with frequency $\omega_1$ and the second frequency down converted wave 120 with frequency $\omega_2$. The three frequencies satisfy the frequency rule Eq. (1), 130. Assuming $\omega_3 > \omega_2 > \omega_1$, the high frequency output wave at $\omega_2$ is usually called the signal and the low frequency output wave at $\omega_1$ is called the idler. Material dispersion and the phase matching condition in Eq. (2) determine the relative propagation angles of the three mixing waves, $\theta$ and $\psi$, as shown in the wave-vector relationship in the dashed box 135. It is evident that the overlap among the three mixing waves is relatively poor when compared with the case with a collinearly phase matching configuration. Any of the waves walking off from the other two terminates energy coupling among the three and degrades the laser conversion efficiency. To increase the laser conversion efficiency, a resonator comprising two reflecting mirrors 140 and 145 can be built to oscillate and amplify the second parametrically generated wave 120. The first parametrically generated wave 125 is coupled out from an output coupler 150. The output coupled can be an index-matching prism atop the nonlinear optical material 115. Such a laser frequency down converter resonating only one output wave is called a singly resonant optical parametric oscillator (SRO). For a resonator with an optical length L, the roundtrip phase of the resonant wave satisfies the longitudinal standing wave condition $$2k_m L + 2\phi = 2m\pi, m = 1, 2, 3. \quad (4)$$

where $k_m$ is the wave number of the $m^{th}$ longitudinal radiation mode and $\phi$ is the reflection phase on the resonator mirror. Here, without loss of generality, the reflection phases from the two mirrors are assumed to be the same, equal to $\phi$. As a result, the longitudinal-mode frequencies of the resonant radiation wave 120 are given by $$\omega_{2,m}=m\omega_{fsr}, \tag{5}$$

where $\omega_{fsr}=2\pi\times c/2L$ is the free spectral range of the resonator and c is the speed of in the resonator. When a second set of cavity mirrors is also inserted to oscillate the other output wave 125, the radiation device is called a doubly resonant optical parametric oscillator (DRO). If the cavity mirrors 140 and 145 are both removed and either the first or the second parametrically generated wave 125 or 120 is seeded by an external radiation source, the radiation device is called an optical parametric amplifier (OPA) or difference frequency generator (DFG).

A Tera-Hertz (THz) wave is usually referred to an electromagnetic wave having a frequency between $10^{11}$ (0.1 THz) and $10^{13}$ Hz (10 THz). The parametric radiation source depicted in FIG. 1 is also widely adopted for generating THz wave radiation via the so-called stimulated polariton scattering (SPS) in some polar nonlinear optical material with parametric gain. For SPS with reference to FIG. 1, the THz wave (idler wave) 125 often emits with a large angle $\psi$ and the red-shifted signal wave 120 emits with a much smaller angle $\theta$ from an optical pump beam 110. The THz parametric oscillator (TPO) in FIG. 1 has been detailed by Kawase et al. in the review article "Terahertz wave parametric source" J. Phys. D: Appl. Phys. 34 (2001) R1-R14. When the slightly red shifted signal wave 120 is externally seeded, the radiation device is called a THz parametric amplifier (TPA). Popular nonlinear polar materials for TPO and TPA include lithium niobate ($LiNbO_3$, LN), lithium tantalate ($LiTaO_3$, LT), Potassium titanyl phosphate ($KTiOPO_4$, KTP), Potassium Titanyle Arsenate ($KTiOAsO_4$, KTA), which are all highly absorptive at THz frequencies. Therefore, the aforementioned TPO or TPA in the prior art suffers from extremely poor THz radiation efficiency due to both the non-collinear phase matching and strong THz absorption in the material. How to effectively and efficiently generate the THz wave via SPS in a non-collinearly matched nonlinear optical material is still under development in the art.

All the non-collinearly phase matched parametric radiation devices suffer from poor overlap among mixing waves and thus poor conversion efficiency due to one or several problems in walkoff, diffraction, and absorption of the mixing waves. Therefore, it is an intention of the present invention to provide a new parametric radiation device and its embodiments to overcome the above-mentioned drawbacks in the prior art.

SUMMARY OF THE INVENTION

In accordance with one aspect of the present invention, an off-axis zigzag parametric oscillator is provided, which includes a laser source generating a pump laser beam, a nonlinear optical material transmitting said pump laser beam along an axis and performing non-collinearly phase matched parametric laser frequency conversion with side-wall reflections to zigzag at least one of the parametrically generated waves about the pump laser beam axis in said material, and an output coupler to couple out the zigzag wave.

In an embodiment, the transverse dimension of the pump laser beam is enlarged to fill up the transverse dimension of the nonlinear optical material defined by the material side walls reflecting the zigzag wave.

In an embodiment, the side-wall reflection is caused by total internal refection of the zigzag wave in the material or by a high reflecting coating layer on the material side wall.

In an embodiment, the output coupler is a prism, a prism array, a transmission grating, or an angle-cut edge on said nonlinear optical material, spoiling the reflection and coupling out the energy of the zigzag wave.

In accordance with another aspect of the present invention, a seeded off-axis zigzag parametric oscillator is provided, which includes a first laser source generating a pump laser beam, a nonlinear optical material transmitting said pump laser beam and performing non-collinearly phase matched parametric laser frequency conversion with side-wall reflections to zigzag at least one of the parametrically generated waves about the pump laser beam axis in said material, an output coupler to couple out the zigzag wave, and a second laser source to injection seed the other parametrically generated wave.

In accordance with a further aspect of the present invention, a doubly resonant off-axis zigzag parametric oscillator is provided, which includes a laser source generating a pump laser beam, a nonlinear optical material transmitting said pump laser beam and performing non-collinearly phase matched parametric laser frequency conversion with side-wall reflections to zigzag one of the parametrically generated waves about the pump laser beam axis in said material, a cavity to resonate the other parametrically generated wave, and an output coupler to couple out the zigzag wave.

In accordance with an advantageous aspect of the present invention, a seeded doubly resonant off-axis zigzag parametric oscillator is provided, which includes a first laser source generating a pump laser beam, a nonlinear optical material transmitting said pump laser beam and performing non-collinearly phase matched parametric laser frequency conversion with side-wall reflections to zigzag one of the parametrically generated waves about the pump laser beam axis in said material, a cavity to resonate one of the two parametrically generated second waves, a second laser source to injection seed the other parametrically generated second wave, and an output coupler to couple out the zigzag wave.

In accordance with an additional aspect of the present invention, a double-side pumped off-axis zigzag parametric oscillator is provided, which includes a laser source generating a pump laser beam, a double-side pumped nonlinear optical material transmitting said pump laser beam in two opposite directions, and performing non-collinearly phase matched parametric laser frequency conversion with side-wall reflections to zigzag at least one of the parametrically generated waves about the pump laser beam axis in said material, and an output coupler to couple out the zigzag wave.

In an embodiment, the double-side pumped off-axis zigzag parametric oscillator is installed in a standing-wave pump laser cavity.

In an embodiment, the double-side pumped off-axis zigzag parametric oscillator is further seeded or doubly resonated.

Additional objects and advantages of the invention will be set forth in the following descriptions with reference to the accompanying drawings.

DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed. For example, although a parametric laser-frequency down-convertor is used to illustrate the present invention, similar concepts and benefits in the illustration are in general applicable to a nonlinear laser-frequency up-converter.

Figure 2:
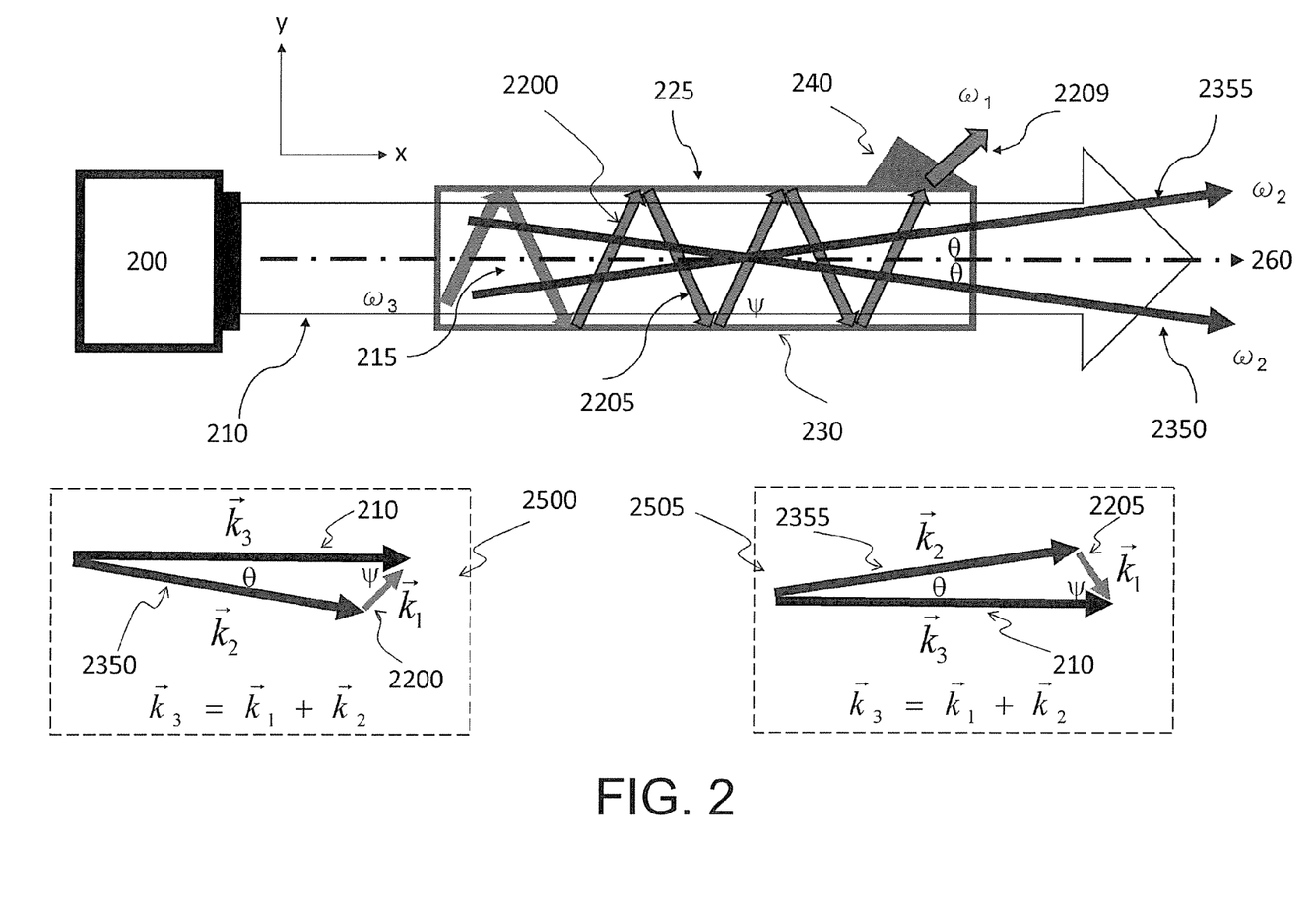
FIG. 2 shows a single-side pumped, singly resonant off-axis zigzag parametric oscillator according to a first embodiment of the present invention.

Refer to FIG. 2, which shows a single-side pumped, singly resonant off-axis zigzag parametric oscillator according to a first embodiment of the present invention. In this embodiment, a laser source 200 emits a pump laser beam 210 to pump a quadratic nonlinear optical material 215 to perform non-collinearly phase matched parametric generation. The pump laser 210 traverses the nonlinear optical material 215 along an axis (dot-dashed line) 260 between two flat reflecting surfaces 225, 230. Owing to symmetry, two sets of the parametrically generated first and second waves (2200, 2350) and (2205, 2355), which satisfy the wave-vector relationships depicted in the dashed boxes 2500 and 2505, respectively, propagate inside the nonlinear optical material 215. At least one pair of the signal or idler waves, in an example, the large-angle off-axis parametrically generated first waves 2200 and 2205, zigzags about the pump axis 260 in the material 215 via reflections at the two flat surfaces 225, 230. The reflection can be caused by total internal reflection (TIR) of the incident wave in the material or by high reflection coatings on the material surfaces 225, 230. The overlap of the mixing waves (210, 2200, 2350) or (210, 2205, 2355) is therefore greatly improved by recycling the off-axis parametrically generated first waves 2200, 2205 back to the pump region via multiple reflections at the two boundaries 225, 230. It should be noted here that the two sets of the mixing waves (210, 2200, 2350) and (210, 2205, 2355) are not independent, because the growth of the wave 2200 benefits from the previous growth of the wave 2205 upon reflection and vice versa, and the pump energy is converted to both sets of the mixing waves. The trapped zigzag wave can be extracted by an output coupler, such as an index-matching prism 240, an array of index-matching prisms, a grating, or an angle-cut edge disposed on the nonlinear optical material 215. To couple out the zigzag wave 2209, which is combined from the parametrically generated first waves 2200 and 2205, the prism 240 has a suitable refractive index to spoil the TIR of the zigzag wave at the material boundary 225. Unlike the zigzag scheme disclosed by U.S. Pat. No. 5,640,480 relying on the reflection phase to achieve collinear quasi-phase matching in a nonlinear laser frequency conversion process, the zigzag reflections of the waves 2200, 2205 in the present invention do not alter the non-collinear phase matching condition of the nonlinear wave mixing process. In other words, between reflections, the parametric conversion from the pump wave 210 to the output waves (2200, 2205, 2350, 2355) is assured all the time by the non-collinear phase matching condition Eq. (2), as long as the three waves overlap each other. Therefore, each segment length of the zigzag path can be many coherence lengths in a thick nonlinear optical material. The boundary reflections simply establish a resonance phase condition or standing wave condition along y for the zigzagging waves 2200, 2205 similar to Eq. (4) for a wave in a resonator, given by $$2k_{y,m}d + 2\phi = 2m\pi, m=1,2,3. \quad (6)$$

where d is the thickness of the nonlinear optical material along y and ω is the reflection phase at the material boundary. Here, without loss of generality, the reflection phase from the top and bottom boundaries is again assumed to be the same, equal to ω. The phase condition Eq. (6) also introduces resonant longitudinal modes to the output wave 2209, which is combined from the parametrically generated first waves 2200 and 2205. Therefore, the device of the present invention illustrated in FIG. 2 is in fact an SRO resonating the wave 2209 in a monolithic structure without any cavity mirror. Throughout this patent, the present invention, with its primary idea illustrated in FIG. 2, is called an off-axis zigzag parametric oscillator.

An additional insight of the present invention is to recognize that, to further increase the overlap of the mixing waves 210, 2200, 2205, 2350, 2355 and therefore the efficiency of an off-axis zigzag parametric oscillator, the pump laser beam area can be enlarged to cover the propagating area of the parametrically generated mixing waves or the gap area between the two refection surfaces, as illustrated in FIG. 2 for the pump beam 210. This idea is particularly useful for parametric generation involving material absorption on either or both the signal and idler waves. Taking the THz SPS as an example, as long as the THz wave is overlapped with the pump laser, the THz wave can continuously grow from the parametric gain offered by the pump laser, even though a nonlinear optical material is highly absorptive at THz frequencies.

The small-angle waves 2350, 2355 can be self-generated from the parametric oscillation of the zigzag waves 2200, 2205 under a strong pump. However, there are useful variants based on the illustration in FIG. 2. For example, one or both the parametrically generated second waves 2350, 2355 can be seeded externally from a second laser source to assist the parametric laser frequency conversion. Such a device can be considered as a seeded singly resonant off-axis zigzag parametric oscillator. Alternatively, to reduce the oscillation threshold and increase the conversion efficiency, a resonant cavity can be built around one or both the parametrically generated second waves 2350, 2355 to realize a doubly resonant off-axis zigzag parametric oscillator. One can also install the nonlinear optical material in a pump laser cavity, so that a standing-wave laser pumps the off-axis zigzag parametric oscillator from two opposites sides and the resonant waves 2200, 2205 zigzags in both longitudinal directions and oscillate strongly inside the nonlinear optical material. Those useful variants are detailed in the following embodiments.

Figure 3:
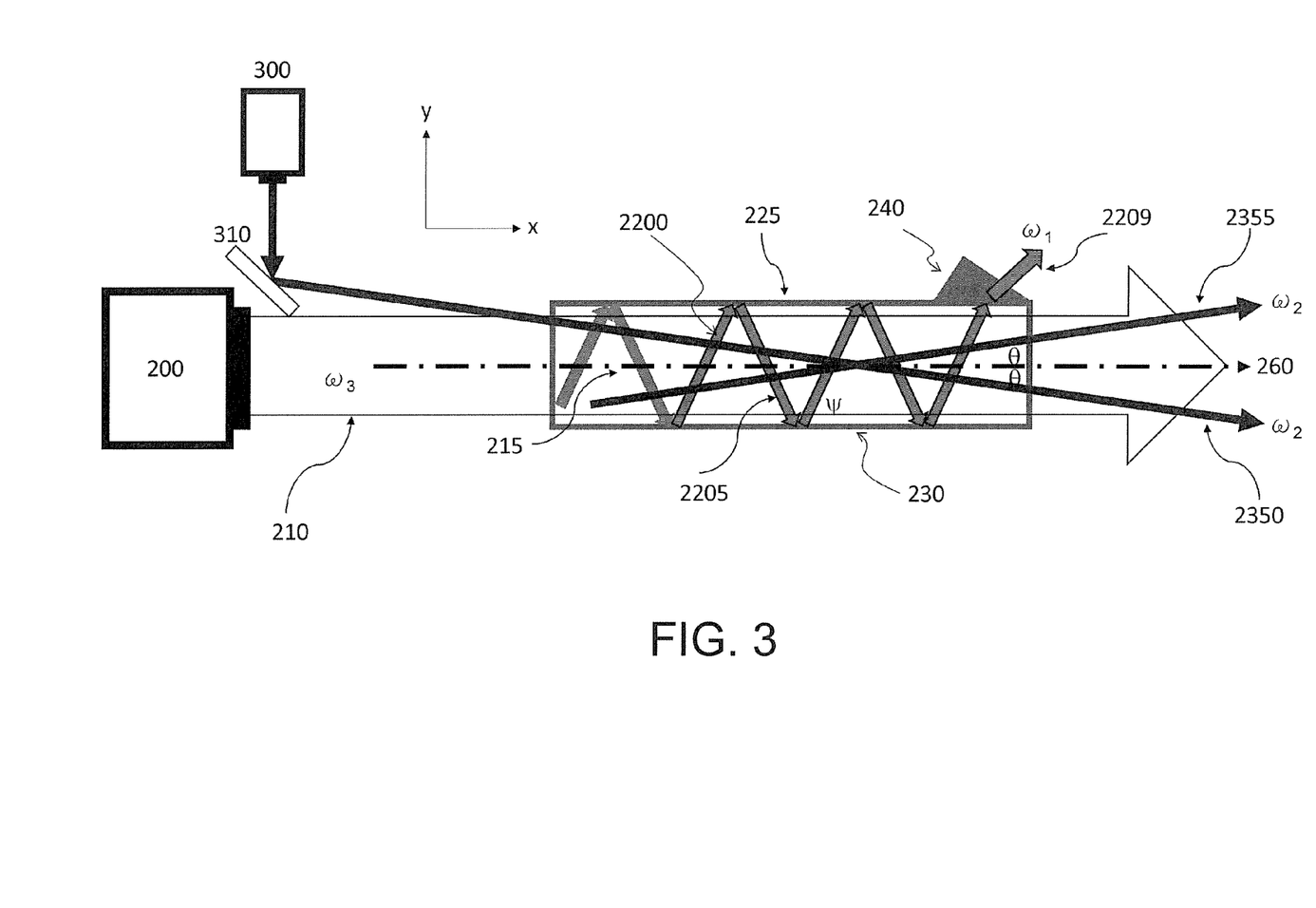
FIG. 3 is a schematic diagram showing a single-side pumped singly seeded, singly resonant off-axis zigzag parametric oscillator according to a second embodiment of the present invention.

Refer to FIG. 3, which is a single-side pumped singly seeded, singly resonant off-axis zigzag parametric oscillator according to a second embodiment of the present invention. This second embodiment of the present invention is an improvement from the first one in FIG. 2 by seeding the parametrically generated second wave 2350 with an external laser source 300 at frequency $\omega_2$. Such external seeding directly helps the parametric conversion of the upward component of the zigzag wave 2200 and defines the output frequency of the zigzag wave 2209 according to the frequency rule, Eq. (1). In other words, given a fixed pump frequency $\omega 3$, the output frequency of the zigzag wave $\omega_1 = \omega_3 - \omega_2$ can be tuned by varying the seed frequency $\omega_2$.

Figure 4:
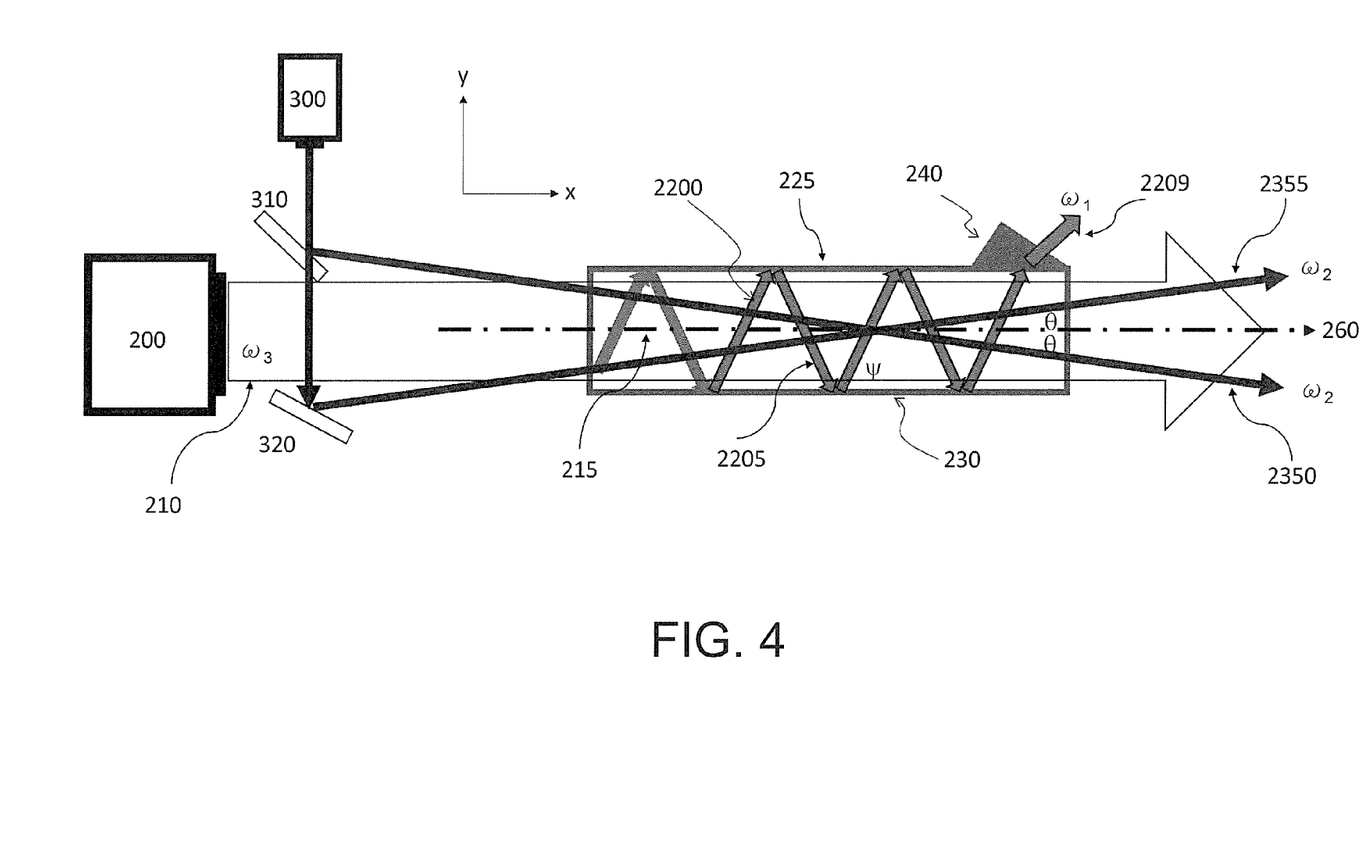
FIG. 4 is a schematic diagram showing a single-side pumped doubly seeded, singly resonant off-axis zigzag parametric oscillator according to a third embodiment of the present invention.

Refer to FIG. 4, which is a schematic diagram showing a single-side pumped doubly seeded, singly resonant off-axis zigzag parametric oscillator according to a third embodiment of the present invention. This third embodiment of the present invention is an improvement from the second one in FIG. 3 by splitting the laser 300 at the beam splitter 310 to seed the other parametrically generated second wave 2355. This addition seeding further helps the parametric conversion of the downward component of the zigzag wave 2205 and therefore the overall parametric conversion efficiency.

Figure 5:
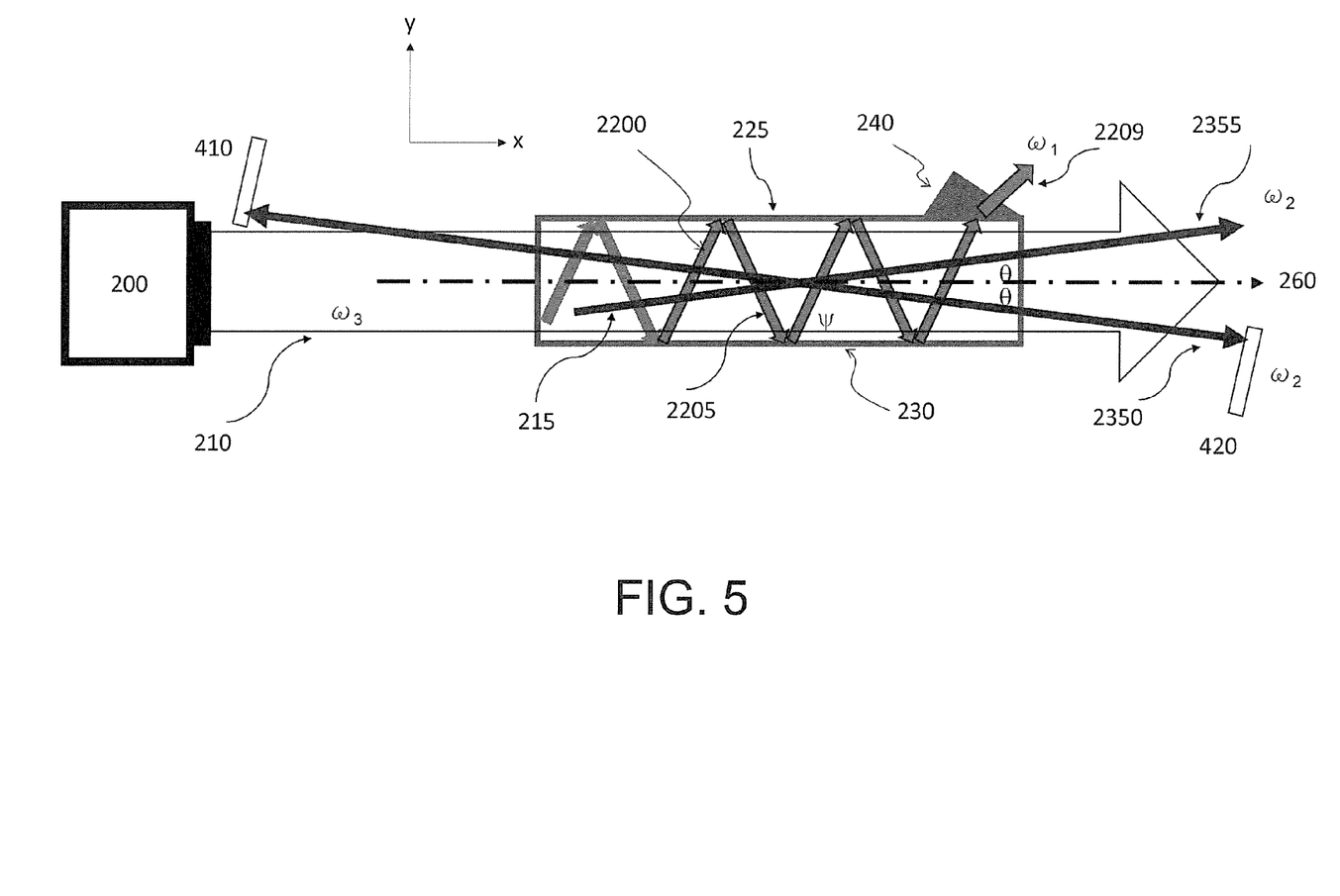
FIG. 5 is a schematic diagram showing a single-side pumped, doubly resonant off-axis zigzag parametric oscillator with a single cavity, according to a fourth embodiment of the present invention.

Refer to FIG. 5, which is a schematic diagram showing a single-side pumped, doubly resonant off-axis zigzag parametric oscillator with a single cavity, according to a fourth embodiment of the present invention. This fourth embodiment of the present invention is an improvement from the first one in FIG. 2 by installing two reflecting mirrors 410, 420 to resonate the parametrically generated second wave 2350. The resonantly amplified wave 2350 directly assists the buildup of the upward component of the zigzag wave 2200. In addition, tuning the angle of the resonator mirrors 410, 420 varies the phase matching angle $\theta$ and tunes the frequencies of the parametrically generated output waves 2350, 2209.

Figure 6:
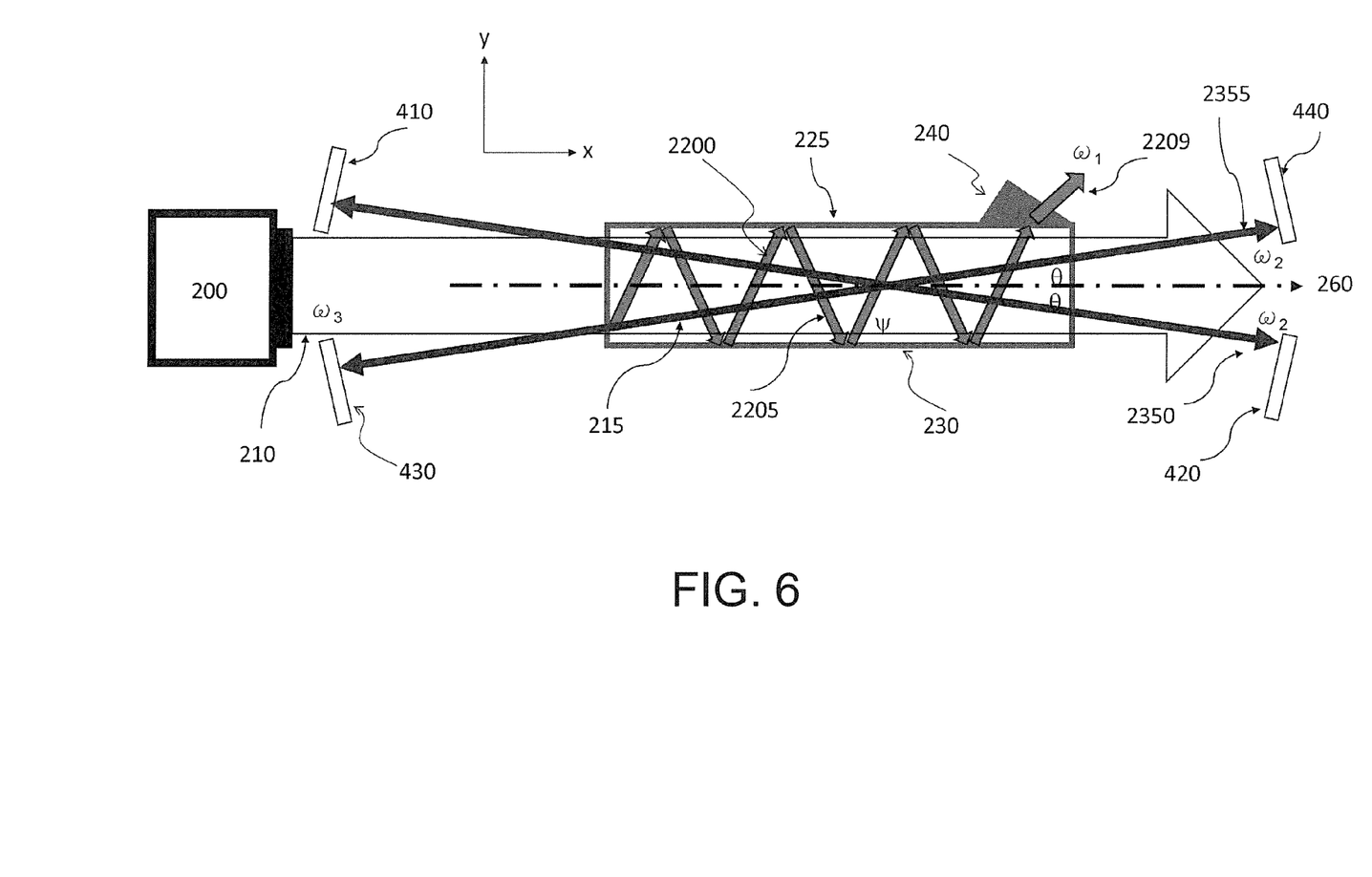
FIG. 6 is a schematic diagram showing a single-side pumped, doubly resonant off-axis zigzag parametric oscillator with double cavities, according to a fifth embodiment of the present invention.

Refer to FIG. 6, which is a schematic diagram showing a single-side pumped, doubly resonant off-axis zigzag parametric oscillator with double cavities, according to a fifth embodiment of the present invention. This fifth embodiment of the present invention is an improvement from the fourth one in FIG. 5 by installing two more reflecting mirrors 430, 440 to further resonate the other parametrically generated second wave 2355. The resonantly amplified wave 2355 further assists the buildup of the downward component of the zigzag wave 2205. With such a double-cavity design, the output zigzag wave 2209, combined from the upward and downward components 2200 and 2205, can be quickly built up.

Figure 7:
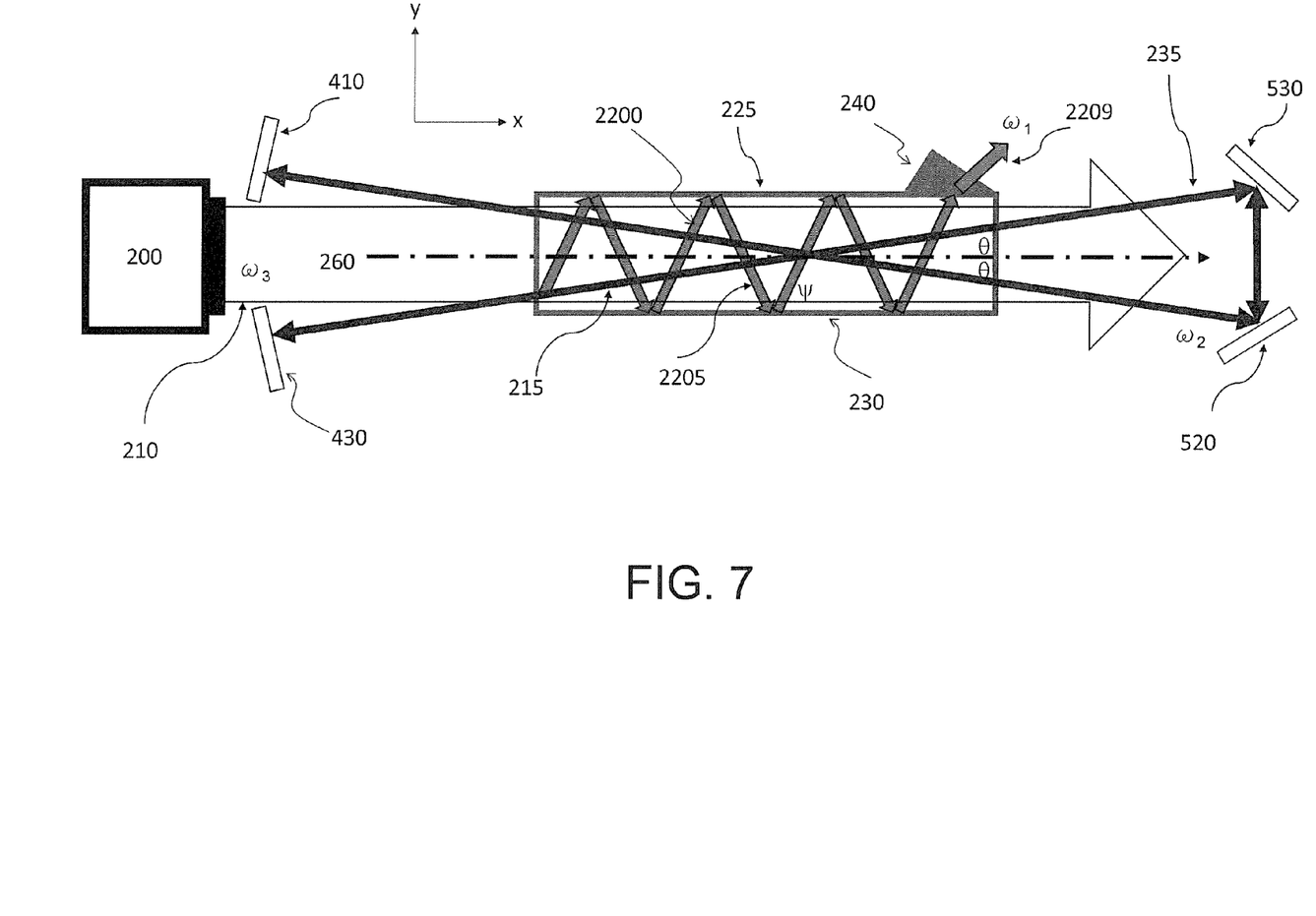
FIG. 7 is a schematic diagram showing a single-side pumped, doubly resonant off-axis zigzag parametric oscillator with a connected cavity, according to a sixth embodiment of the present invention.

Refer to FIG. 7, which is a schematic diagram showing a single-side pumped, doubly resonant off-axis zigzag parametric oscillator with a connected cavity, according to a sixth embodiment of the present invention. This sixth embodiment of the present invention is an improvement from the fifth one in FIG. 6 by installing the deflecting mirrors 520, 530 to merge the two resonant cavities in FIG. 6 into a connected one for the parametrically generated second wave 235. This connected resonator, defined by the mirrors 410, 430, 520, 530, oscillates a single wave 235 with mode frequencies defined from a single resonator, which improves the spectral purity of the output zigzag wave 2209.

Figure 8:
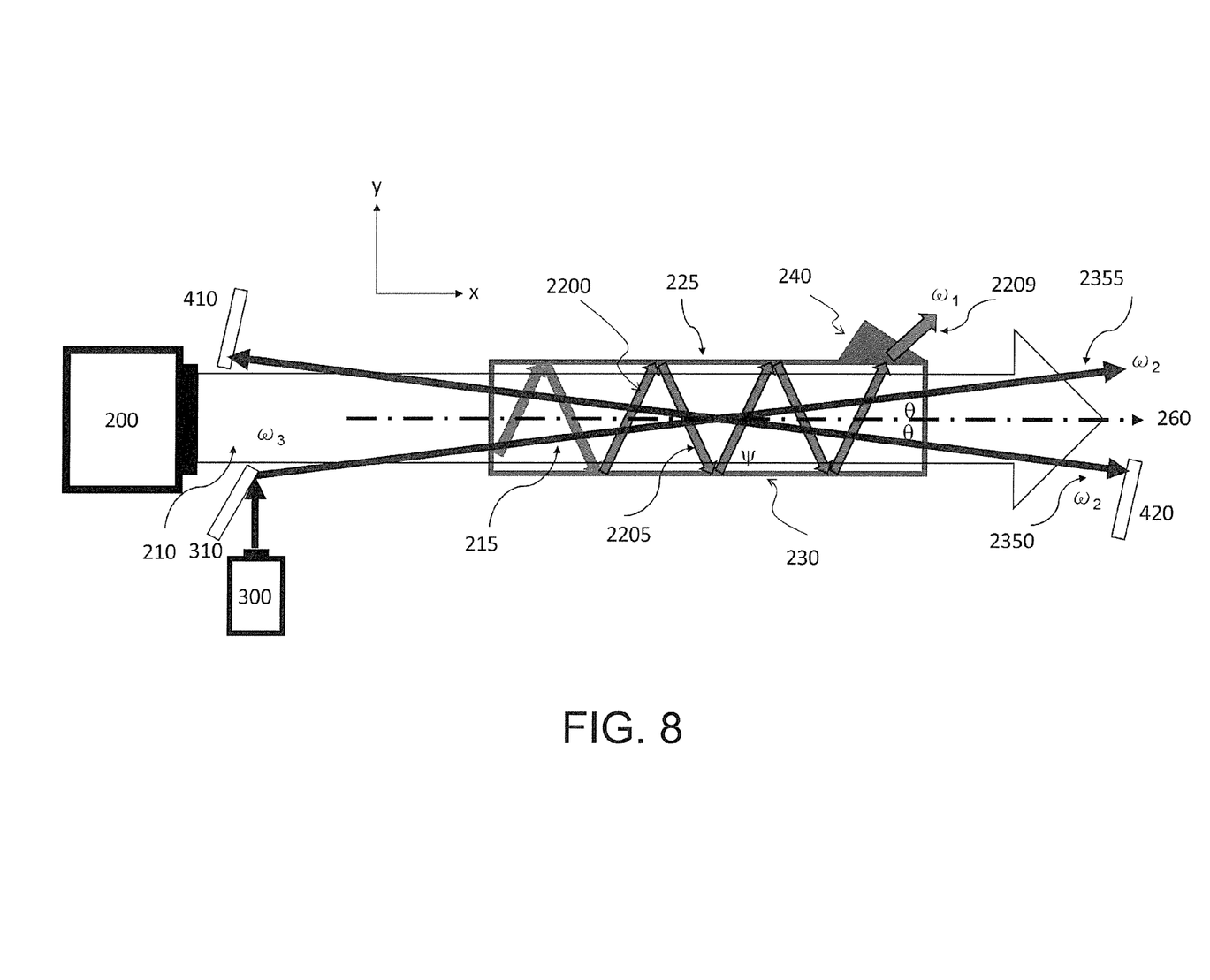
FIG. 8 is a schematic diagram showing a single-side pumped, seeded doubly resonant off-axis zigzag parametric oscillator according to a seventh embodiment of the present invention.

Refer to FIG. 8, which is a schematic diagram showing a single-side pumped, seeded doubly resonant off-axis zigzag parametric oscillator according to a seventh embodiment of the present invention. This seventh embodiment of the present invention combines both the advantages of the second embodiment with a seed laser 300 to the parametrically generated second wave 2350 and the fourth embodiment with a resonator for the other parametrically generated second wave 2355.

Figure 9:
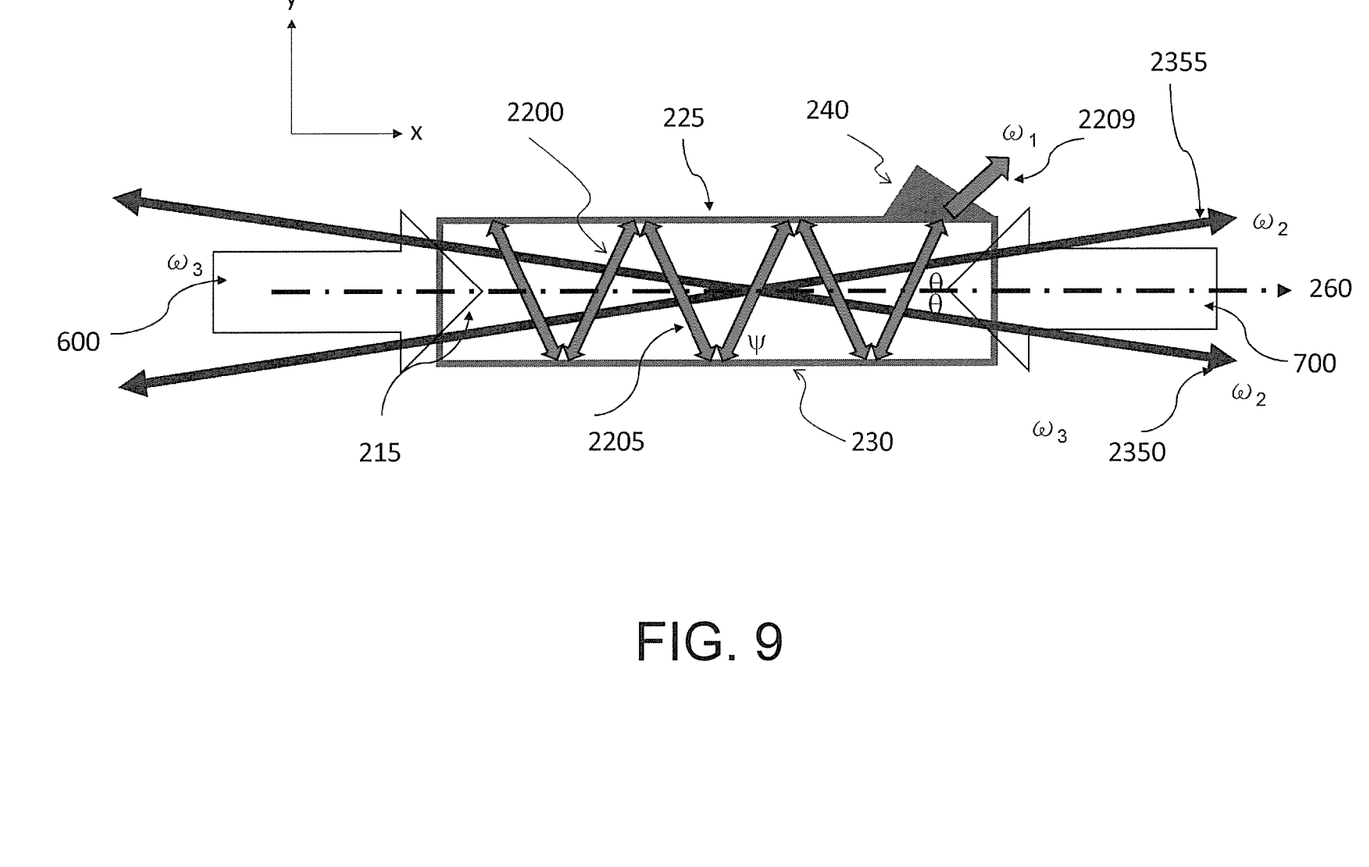
FIG. 9 is a schematic diagram showing a double-side pumped singly resonant off-axis zigzag parametric oscillator according to an eighth embodiment of the present invention.

Refer to FIG. 9, which is a schematic diagram showing a double-side pumped singly resonant off-axis zigzag parametric oscillator according to an eighth embodiment of the present invention. This eighth embodiment of the present invention is an improvement from the first one in FIG. 2 by pumping the nonlinear optical material 210 from two opposite directions along the pump axis 260. The two counter-propagating pump laser beams 600, 700 provide parametric gain in both directions. This design is particular useful to realize a low-threshold and high efficiency off-axis zigzag parametric oscillator. The backward pump beam 700 can be obtained by simply reflecting the forward pump beam 600 at the right side of the nonlinear optical material 215. Alternatively this double-side pumping scheme can be implemented by installing the nonlinear optical material 215 into a standing-wave laser cavity generating the pump laser at $\omega_3$. In addition, the external seeding lasers and additional resonant cavities adopted by the $2^{nd}$, $3^{rd}$, $4^{th}$, $5^{th}$, $6^{th}$, and $7^{th}$ embodiments of the present invention in FIGS. 3-8 are also applicable to this double-side pumped off-axis zigzag parametric oscillator.

What is claimed is:

1. A parametric oscillator comprising:
   a laser source, configured to generate a pump laser beam;
   a nonlinear optical material, configured to transmit said pump laser beam with a straight-through pump beam axis surrounded by a plural number of flat surfaces, wherein a parametrically generated wave as a first wave zigzags about said pump beam axis via reflections from said flat surfaces and another parametrically generated radiation as two second waves emits symmetrically about said pump beam axis; and
   an output coupler, disposed on the nonlinear optical material to couple out said parametrically generated wave.

2. A parametric oscillator according to claim 1, wherein said pump laser beam has a transverse size filling up a gap between said flat surfaces.

3. A parametric oscillator according to claim 1, wherein said nonlinear optical material is one selected from Lithium Niobate ($LiNbO_3$, LN), Lithium Tantalate ($LiTaO_3$, LT), Potassium Titanyl Phosphate ($KTiOPO_4$, KTP), Potassium Titanyle Arsenate ($KTiOAsO_4$, KTA), Rubidium Titanyle Arsenate ($RbTiOAsO_4$, RTA), Lithium Triorate (LBO), and Gallium Arsenide (GaAs).

4. A parametric oscillator according to claim 1, wherein said parametrically generated wave is generated from stimulated polariton scattering.

5. A parametric oscillator according to claim 1, wherein said parametrically generated wave has a frequency between 0.1 THz and 10 THz.

6. A parametric oscillator according to claim 1, wherein said output coupler is one selected from an index-matching prism, an array of index-matching prisms, a grating, and an angle-cut edge atop one of said flat surfaces.

7. A parametric oscillator according to claim 1, wherein said pump laser beam is a standing-wave laser beam.

8. A parametric oscillator according to claim 7, the standing-wave laser beam is one inside a laser cavity.

9. A parametric oscillator according to claim 1, further comprising:
   a second laser source, having a frequency equal to that of said second waves, configured to seed one of said second waves inside said nonlinear optical material.

10. A parametric oscillator according to claim 9, wherein said second laser source is split to seed both said second waves inside said nonlinear optical material.

11. A parametric oscillator according to claim 1, further comprising:
   a resonator configured to oscillate one of said second waves inside said nonlinear optical material.

12. A parametric oscillator according to claim 11, wherein said resonator oscillates both said second waves inside said nonlinear optical material.

13. A parametric oscillator according to claim 1, further comprising:
   a second laser source, having a frequency equal to that of said second waves, configured to seed one of said second waves inside said nonlinear optical material, and
   a resonator, configured to oscillate the other second wave symmetrically generated from the other side of said pump beam axis.

* * * * *